United States Patent [19]

Sasage

[11] Patent Number: 4,717,205
[45] Date of Patent: Jan. 5, 1988

[54] CUTTER

[76] Inventor: Norio Sasage, 7-22, Akishino Sanwa-cho 1-chome, Nara-shi, Nara-ken, Japan

[21] Appl. No.: 874,693

[22] Filed: Jun. 16, 1986

[30] Foreign Application Priority Data

Jun. 17, 1985 [JP] Japan .............................. 60-90144[U]

[51] Int. Cl.$^4$ ............................................. E21C 25/18
[52] U.S. Cl. .......................................... 299/39; 125/5; 404/87; 404/90
[58] Field of Search .................... 299/39, 15; 125/3, 5; 404/87, 90

[56] References Cited

U.S. PATENT DOCUMENTS

| | | | |
|---|---|---|---|
| 932,591 | 8/1909 | Smith | 299/39 |
| 1,087,476 | 2/1914 | Williams | 299/39 |
| 1,141,268 | 6/1915 | Reed | 299/39 |
| 4,134,459 | 1/1979 | Hotchen | 299/39 X |
| 4,230,372 | 10/1980 | Marten | 299/15 X |
| 4,542,940 | 9/1985 | Marten | 299/15 X |

FOREIGN PATENT DOCUMENTS 692312 8/1965 Italy ...................................... 299/15

Primary Examiner—Stephen J. Novosad
Attorney, Agent, or Firm—Steinberg & Raskin

[57] ABSTRACT

A cutter is disclosed. The cutter comprises a frame, driving means mounted on said frame, having an output shaft, a casing mounted on said frame and rotatably receiving said output shaft at one end thereof, a rotatable shaft rotatably mounted on said casing at the other end thereof, driving force transmitting means mounted in said casing for transmitting the driving force of said output shaft to said rotatable shaft, and cutting means fixedly mounted on said rotatable shaft substantially at each outermost axial end thereof, and wherein said casing is interposed between said cutting means.

22 Claims, 4 Drawing Figures

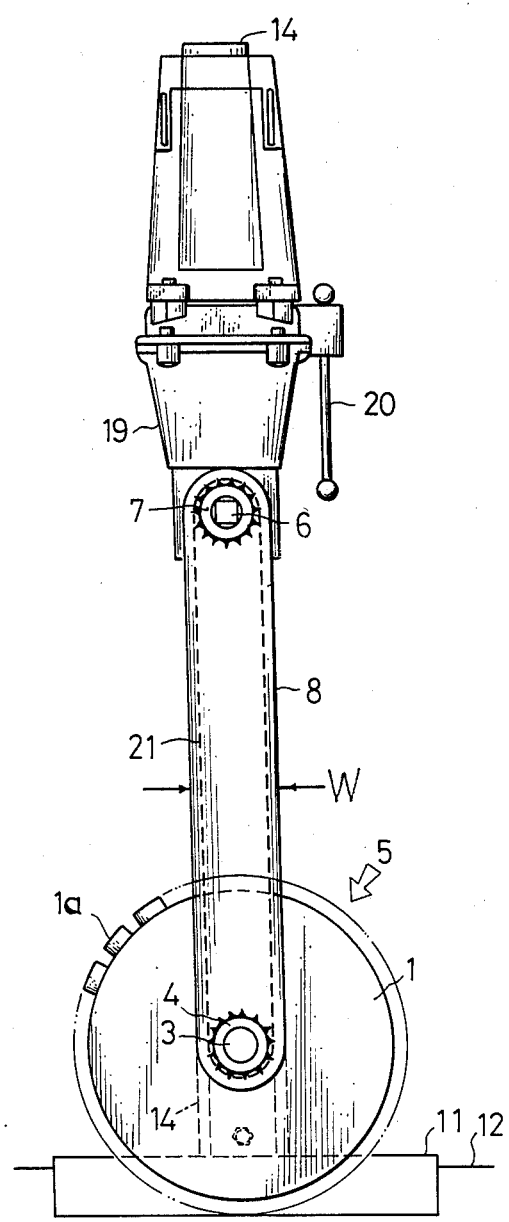
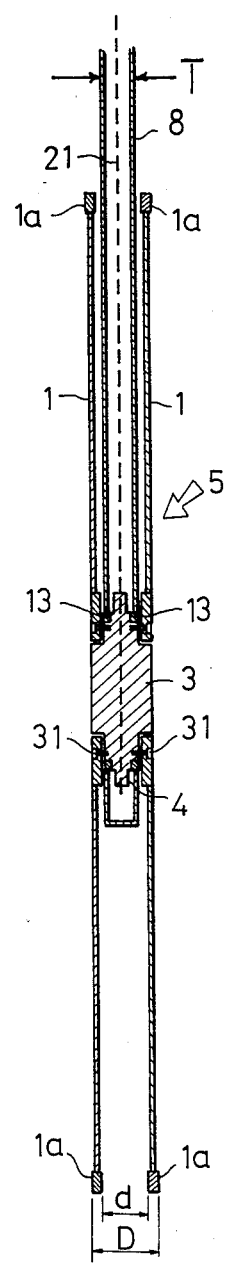

CUTTER

BACKGROUND OF THE INVENTION

The present invention relates to a cutter for use in civil engineering and construction works and, more particularly, to a cutter having disc-type blades for cutting concrete, brick, tile, or the like, in civil engineering and construction works.

In a conventional cutter for cutting a Hume concrete pipe, a concrete secondary product, bricks, tiles, asphalt or the like in civil engineering and construction works, a disc-type blade having diamond tips in its periphery is rotated by an electric motor. In order to ensure the safety of the cutting operation, the disc-type blade is partially covered with a safety cover, and the blade is secured directly to a rotary shaft of the electric motor or to a transverse rotary shaft of a speed reduction mechanism which is connected to the rotary shaft of the electric motor.

Accordingly, in the actual cutting operation, such a safety cover for the blade or such a rotary or transverse rotary shaft to which the blade is secured, restricts the blade cutting concrete or the like to a certain depth and hence the cutting blade can not enter entirely into concrete or the like while cutting the same. For example, the blade can be buried only up to ⅓ of its diameter into concrete. In other words, when a concrete plate is cut, a blade having a diameter three times as long as the thickness of the concrete plate must be used.

As a result, there is much needless expenditure of both material (and thus, of course, increased manufacturing costs) for such a conventional cutter, since the blade or cutter can be buried up to only a proportion of its diameter. Further, use of the conventional cutter results in excessive cutting of concrete or the like and, finally, it is inconvenient to transfer or transport the conventional cutter. In addition, when the cutting operation is carried out in a narrow working space, operational efficiency is lowered, and the danger of the cutting operation is increased.

SUMMARY OF THE INVENTION

Accordingly, it is an object of the present invention to provide a cutter, free from the aforementioned defects and disadvantages of the prior art, which is capable of cutting a depth of at least the entire length of the diameter of the blade of the cutter. It is another object of the invention to provide a cutter which is capable of ensuring a safe and economical cutting operation. It is still another object of the invention to provide a cutter which is compact. Finally, is an object of the invention to provide a cutter which can be manufactured economically.

In accordance with the invention, there is provided a cutter comprising a frame, driving means mounted on said frame, having an output shaft, a casing mounted on said frame and rotatably receiving said output shaft at one end thereof, a rotatable shaft rotatably mounted on said casing at the other end thereof, driving force transmitting means mounted in said casing for transmitting the driving force of said output shaft to said rotatable shaft, and cutting means fixedly mounted on said rotatable shaft substantially at each outermost axial end thereof, and wherein said casing is interposed between said cutting means.

BRIEF DESCRIPTION OF THE DRAWINGS

Other and further objects, features and advantages of the invention will appear more fully from the following description taken in connection with the preferred embodiments thereof with reference to the accompanying drawings, in which:

FIG. 2 is a left side view of FIG. 1, in which a left side blade is removed;

FIG. 3 is an enlarged front view of a cutter body of the cutter of FIG. 1; and

DESCRIPTION OF PREFERRED EMBODIMENTS

Figure 1:
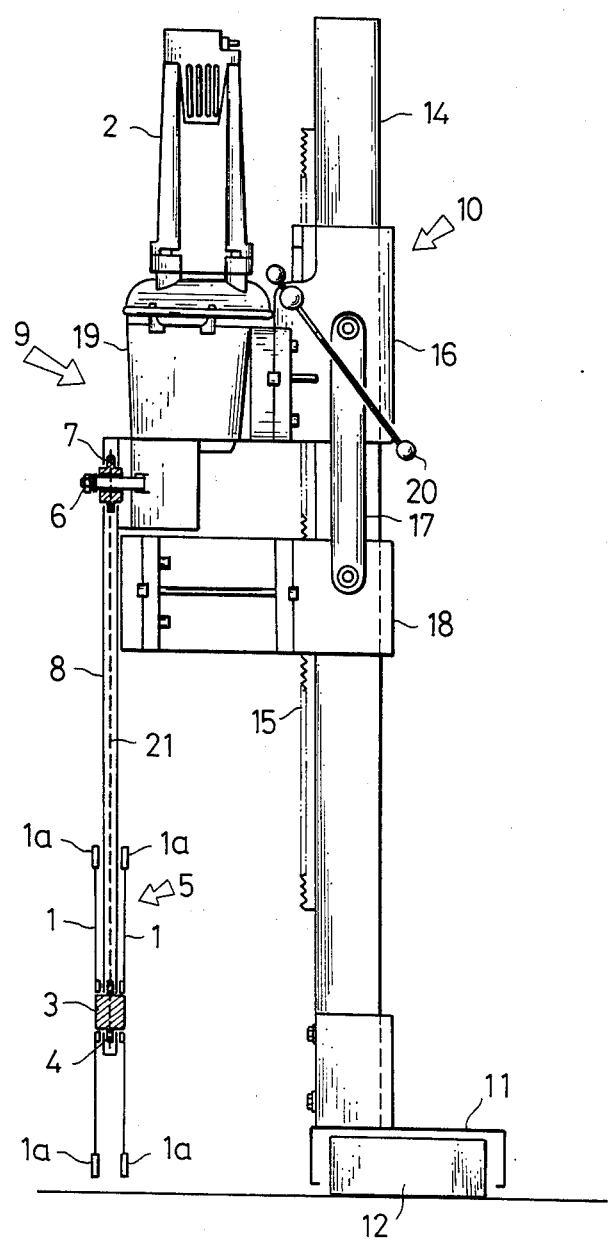
FIG. 1 is a front view of a cutter according to the present invention.

Referring now to the drawings, wherein similar or corresponding components are designated by like reference numerals throughout the different figures and hence a description of the structure and function of such like components can be omitted for the sake of brevity, there is shown in FIGS. 1-3, a cutter having disc-type blades 1 for cutting concrete secondary products such as floors, walls, pipes and roads, bricks, tiles, or the like, used in civil engineering and construction works.

The cutter includes an electric motor 2, a cutter body 5, a transmission mechanism 9 for transmitting the drive force of the electric motor 2 to the cutter body 5, a lift 10 for reciprocally moving up and down the combination of the electric motor 2, the transmission mechanism 9 and the cutter body 5, a slidable base 11 for supporting the lift 10, and a rail 12 along which the base 11 is slid.

The cutter body 5, as shown by longitudinal cross sectional views in FIGS. 1 and 3, includes a rotary shaft 3 of short length, a pair of disc-type blades 1 having the same diameter and coaxially secured to the shaft 3 perpendicular thereto and substantially parallel with each other in the opposite outermost ends of the shaft 3 by using hexagon bolts 31 so that the opposite outermost surfaces of the blades 1 and the opposite end surfaces of the shaft 3 may be in substantially the same respective planes, a sprocket 4 having a much smaller diameter than that of the blades 1 and which is coaxially secured to the middle portion of the shaft 3, and a pair of bearings 13 which are mounted to an arm member or a casing 8 on both adjacent sides of the sprocket 4 for receiving the shaft 3 between the two blades 1.

The blades 1, which have the same diameters, thicknesses and so forth, are provided with diamond tips 1a in their peripheries and are arranged with a space d between their inner surfaces substantially parallel with each other.

The lift 10 comprises a square pillar 14 standing on the base 11, a rack 15 secured to the pillar 14 along its longitudinal outer surface, a support member or a frame 16, which is movably mounted to the pillar 14, for supporting the combination of the motor 2, the transmission mechanism 9 and the cutter body 5, and an antivibration member 18 suspended through brackets 17 to the support member 16.

Actually, the electric motor 2, the transmission mechanism 9, speed reduction device 19 and the cutter body 5 are supported by the support member or the frame 16. The support member 16, which has a square cylinder form, is provided with a pinion (not shown) which engages the rack 15 of the pillar 14 and hence it is coaxially and slidably mounted to the pillar 14 through this engaging of the rack and the pinion with each other. The up-down movement of the support member 16 is operated by a handle 20 which is coaxially mounted to the pinion which is provided on the support member 16. The antivibration member 18, which has a square cylinder form, is also coaxially fitted onto the pillar 14 so as to smoothly slide along the pillar 14 together with the support member 16. The antivibration member 18 is provided with a shock absorbing member made of a rubber or a plastic material in the end close to an arm member 8 which is fixedly connected to the frame or the support member 16.

The transmission mechanism 9 is comprised of the speed reduction device 19 for transmitting the drive force of the motor 2 to the cutter body 5, an output rotary shaft 6 of the speed reduction device 19, a sprocket 7 secured to the output rotary shaft 6, and a chain 21 which is extended between the sprocket 7 and the sprocket 4 of the cutter body 5 and arranged within the arm member 8. A pair of bearings (not shown) are mounted to the arm member 8 on both adjacent sides of the sprocket 7 for receiving the shaft 6. Thus, the shaft 6 is rotatably supported by the arm member 8 through the bearings.

The arm member 8 is fixedly mounted on the support member 16 or frame and surrounds the sprockets 4 and 7 and the chain 21 suspended therebetween, thus acting as a safety cover. At an end of the arm member 8, the shaft 3 is supported by the arm member 8 through the bearings 13 at the portion between the two blades 1. The thickness T (FIG. 3) of the arm member 8 is smaller than the space d between the two blades 1, and the width W (FIG. 2) of the arm member 8 is much smaller than the diameter of the blades 1.

The rail 12 may be fixed to a cutter installation surface by means of bolts, or the like. The slidable base 11 may be moved along the rail 12 by pushing the pillar 14 after releasing a lock handle (not shown) and may be locked at a proper position by tightening the lock handle. Further, a cramp (not shown) is added to the support member 16 in order to lock it to the pillar 14 at a proper height.

In this embodiment, for example, the diameter of the blades 1 is 300 mm, and the space d between the two blades is 14 mm. The entire length and width W of the arm member 8 are 650 mm and 80 mm, respectively. The total length of the pillar 14 and the rail 12 is 1060 mm. However, these values may, of course, be modified depending on the thickness of the object to be cut by the cutter. The space d between the two blades 1 is preferably set at approximately 10-30 mm, as described in detail hereinafter.

The operation of the cutter aforementioned will be described as follows. First, the cutter is installed on the floor of the construction site, and the cutter body 5 is moved to the predetermined position. Then, the pillar 14 is locked to the rail by operating the locking handle, as shown in FIG. 1. Next, the electric motor 2 is switched on, and the support member 16 together with the cutter body 5 are moved slowly down by operating the up-down handle 20 and the lock handle. The rotating force of the electric motor 2 is now transmitted to the rotary shaft 3 of the cutter body 5 through the speed reduction device 19, the output shaft 6, the sprocket 7, the chain 21 and the sprocket 4, thereby rotating the blades 1. Then, the diamond tips of the blades 1 are contacted to an object such as concrete in order to start the cutting operation.

Since a vibration is transmitted from the electric motor 2 to the blades 1 during the rotation of the blades 1, some unavoidable vibration or shock is caused in the diamond tips of the blades 1 in the directions perpendicular to and parallel with the surfaces of the blades 1. Accordingly, in the cutting operation, two cutting grooves parallel to each other corresponding to the tips of the two blades are formed at the beginning, but, when the cutter body 5 is buried in the concrete, the concrete plate cut between the two cutting grooves is broken by the vibration or shock of the tips of the blades. Then, the broken concrete pieces are automatically raked out by the rotating tips of the blades.

In the embodiment, since the opposite outermost surfaces of the two blades 1 and the opposite end surfaces of the shaft 3 are substantially in the same planes, there is nothing projecting outwards beyond a space D defined by the outermost surfaces of the tips of the two blades 1 in the cutter body 5. Hence, the cutting operation can be continuously carried out until the cutter body 5 is buried at least below the surface of the concrete to be cut. In the embodiment shown in FIGS. 1 and 2, since the arm member 8 possesses a thickness T considerably smaller than the space d between the two blades and is inserted in the cutter body 5 between the two blades 1 and thus extends approximately twice as long as the diameter of the blades, the cutter body 5 can enter into the concrete until the bottom of the antivibration member 18 abuts on the surface of the concrete to be cut; that is, the cutter body 5 can cut the concrete to a depth equal to the distance from the bottom of the antivibration member 18 to the lower ends of the blades 1. Therefore, although the conventional cutter can cut concrete having only a ⅓ thickness of the diameter of the blade, the cutter of the present invention can cut concrete having an approximate thickness twice as long as the diameter of the blades. The cutting depth attained by using the present cutter may be further readily increased by extending the length of the arm member 8 or reducing the size of the antivibration member 18.

In order to effectively conduct the cutting of the concrete as well as the breaking-down of the cut concrete and the scraping out of the broken concrete pieces, it is preferable that the space d between the two blades 1 be set at approximately 10-30 mm, even when the composition of the concrete material is different. In this case, a groove or hole having approximately the same width as the space D can be readily cut and hence a rectangular opening can be readily formed in a concrete wall or floor.

When the space d is larger than 30 mm, the manufacture of the shaft 3, the bearings 13 and the arm member 8 is easy, but the thickness of the concrete plate cut is relatively large and thus the breaking-down of the cut concrete and the scraping out of the broken-down concrete is insufficient. On the other hand, when the space d is smaller than 10 mm, the opposite effects to the above case result. However, even when the concrete plate cut remains in the hole, it can be readily broken-down and the broken concrete pieces readily raked out by proper means and hence there is no problem in this case.

In order to cut a groove or hole having a width wider than the space D, a cutter body including a plurality of disc-type blades 1 which are coaxially secured to a rotary shaft in a similar manner to the cutter body 5 above described, may be effectively used.

Figure 4:
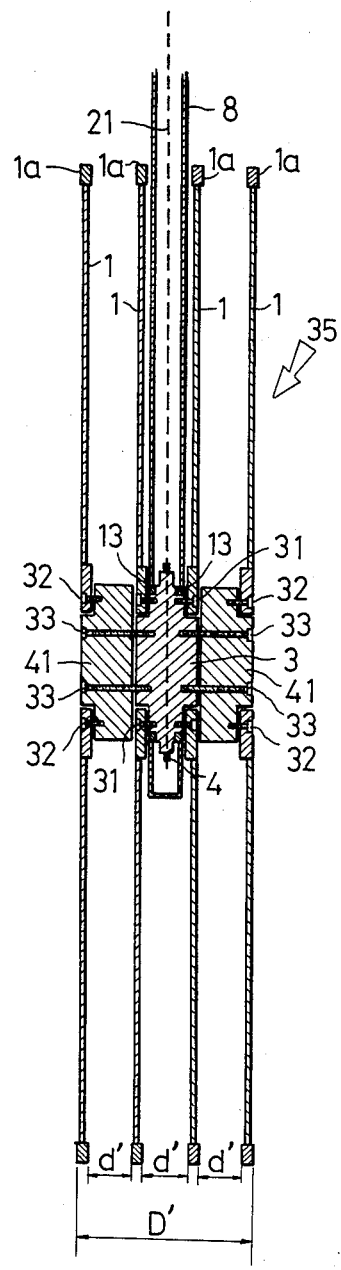
FIG. 4 is an enlarged front view of another cutter body used in the cutter of FIG. 1.

In FIG. 4, there is shown another cutter body 35 used in a cutter according to the present invention. In this embodiment, four disc-type blades 1 are coaxially disposed on the shaft at an equal space d' between two adjacent blades substantially parallel to each other. A groove or hole having a width corresponding to a space D' defined by the outermost surfaces of the tips 1a of the outer blades 1 is formed by one cutting operation. In this case, the inner two blades 1 of the cutter body 35 are constructed in the same manner as the cutter body 5 shown in FIG. 1, and the outer two blades 1 are secured to the opposite ends of the shaft 3 via supplementary shaft members 41, which have the same diameter as that of the shaft 3, by using hexagon bolts 32 and 33. The four blades 1 may be arranged at different intervals according to the present invention. In this embodiment, the same effects and advantages as those of the embodiment shown in FIG. 1 may be obtained.

In this embodiment, when the equal space d' between the two adjacent blades of the four blades 1 is set at approximately 20 mm, a groove or hole having a width of more than 60 mm is conveniently cut out by one operation, and the concrete plate cut is broken-down and scraped out automatically during the cutting of the concrete in the same manner as the first embodiment described above.

In another example, when the equal space d' between the two adjacent blades of the four blades 1 is approximately 45–50 mm, four parallel grooves or holes are cut at a distance of approximately 150 mm from each other by one cutting operation, and then the three plates may be readily cut out, thereby forming a rectangular groove or hole having a width of approximately 150 mm.

It is readily understood from the above description of the preferred embodiments of the present invention, that concrete or the like can be effectively cut by a simple operation and especially can be cut to at least the same depth as the diameter of the blades. Further, according to the present invention, a cutter having a simple structure can be obtained, and a safe and economical cutting operation be ensured.

Although the present invention has been described in its preferred embodiments with reference to the accompanying drawings, it is readily understood that various changes and modifications may be made without departing from the spirit and scope of the present invention.

For instance, in order to strengthen the arm member 8, the width of the arm member 8 may be approximately the same as the diameter of the blades. In the cutter according to the present invention, the antivibration member is not always essential, but it is very effective in preventing damage to the blades when the blades are severely vibrated. Further, both sides of the arm member 8 may be effectively supported by the antivibration member in contact therewith. Instead of a transmission mechanism comprising a pair of sprockets 4 and 7 and a chain 21, a combination of gear wheels or a pair of gear wheels and a connection rod arranged there between may be used. Further, the cutter may be made compact by omitting the pillar 14, the support member 16 of the square cylindrical form, the antivibration member 18 and the updown handle 20, and another handle for holding and carrying the cutter may be attached to the frame. As to the diamond tips of the blades, other conventional edge materials can be used.

What is claimed is:

1. A cutter comprising
   a frame,
   driving means mounted on said frame, and having an output shaft,
   an elongated casing mounted on said frame and rotatably receiving said output shaft at one end thereof,
   a rotatably shaft rotatably mounted on said casing at the other end thereof,
   driving force transmitting means mounted in said casing for transmitting the driving force of said output shaft to said rotatable shaft, and
   cutting means fixedly mounted on said rotatable shaft substantially at each outermost axial end thereof, and
   wherein said casing is interposed between said cutting means,
   wherein said cutting means include at least two disc-type blades having substantially the same diameter and being arranged substantially parallel with one another and secured to the rotatable shaft substantially perpendicular thereto so that each of outermost surfaces of the blades and each of end surfaces of the rotatable shaft are in substantially the same plane, and
   wherein a thickness of said casing in an axial direction of said rotatable shaft and over substantially an entire length of said casing between the ends thereof is smaller than a spacing between inner peripheries of said blades opposite one another in the axial direction.

2. The cutter as defined in claim 1, wherein a width of said casing in a direction substantially parallel to a radial direction of said blades is smaller than the diameter of the blades.

3. The cutter as defined in claim 1, wherein the cutting means comprises two disc-type blades.

4. The cutter as defined in calim 3, wherein the two disc-type baldes are arranged with a spacing of approximately 10–30 mm between the inner peripheries thereof facing one another in the axial direction of the rotatable shaft.

5. The cutter as defined in claim 1, wherein the cutting means comprise four disc-type blades.

6. The cutter as defined in claim 5, wherein the four disc-type blades are arranged apart from one another with a substantially equal spacing of approximately 20 mm between the inner peripheries of adjacent blades in the axial direction of the rotatable shaft.

7. The cutter as defined in calim 5, wherein the four disc-type blades are arranged apart from one another with a substantially equal spacing of approximately 45–50 mm between the inner peripheries of adjacent blades in the axial direction of the rotable shaft.

8. The cutter of claim 5, wherein said casing is interposed between the innermost two of said four blades.

9. The cutter as defined in claim 1, wherein the drive force transmitting means comprise a first sprocket fixedly mounted on said output shaft and a second sprocket fixedly mounted on said rotatable shaft and a chain, said chain being extended between the first and the second sprockets.

10. The cutter as defined in claim 1, and further comprising reciprocating means for reciprocating said casing along with said cutting means, said reciprocating means including a support member and a guide member slidably mounted on said support member and fixed to said frame.

11. The cutter of claim 2, additionally comprising
a substantially vertical pillar,
said frame being movably mounted upon said pillar for displacement therealong.

12. The cutter of claim 11, wherein said pillar comprises a rack and said frame comprises a pinion engaging said rack,
with said frame being substantially coaxially and slidably mounted for movement along said pillar through said rack and pinion.

13. The cutter of claim 11, additionally comprising an anti-vibration member suspended from said frame.

14. The cutter of claim 13, wherein said anti-vibration member suspended from said frame is substantially coaxially fitted onto said pillar for smooth sliding therealong together with said frame.

15. The cutter of claim 13, wherein said cutter is insertable into material to be cut by the same, to a depth substantially equal to a distance from a lower end of said anti-vibration member to lower ends of said blades.

16. The cutter of claim 13, wherein said anti-vibration member comprises a shock absorbing member at an end thereof close to said casing.

17. The cutter of claim 11, additionally comprising
a base upon which said pillar is mounted, and
a rail upon which said base is slidably mounted for movement therealong.

18. The cutter of claim 1, wherein the outermost surfaces of said blades and end surfaces of said rotatable shaft constitute an outermost projection of said cutting means in the axial direction of said rotatable shaft.

19. The cutter of claim 1, wherein said casing has a length between said ends thereof about twice the diameter of said blades, with said cutting means disposed to cut to a depth approximately twice as long as the blade diameter.

20. The cutter of claim 1, wherein said casing and frame are mounted for substantially vertical displacement.

21. The cutter of claim 1, wherein said driving means comprise a motor, and
said motor and said casing are separately mounted upon said frame from one another.

22. A cutter comprising:
a frame,
driving means mounted on said frame, and having an output shaft,
an elongated casing mounted on said frame,
a rotatable shaft rotatably mounted on said casing at one end thereof,
driving force transmitting means mounted in said casing for transmitting the driving force or said output shaft to said rotatable shaft, and
cutting means fixedly mounted on said rotatable shaft substantially at each outermost axial end thereof, and
wherein one end of said casing is interposed between said cutting means,
said cutting means include at least two disc-type blades having substantially the same diameter and being arranged substantially parallel with one another and secured to the rotatable shaft substantially perpendicular thereto so that each of outermost surfaces of the blades and each of end surfaces of the rotatable shaft are in substantially the same plane,
and wherein a thickness of said casing in an axial direction of said rotatable shaft and over substantially an entire length of said casing is smaller than a spacing between inner peripheries of said blades opposite one another in the axial directon.

* * * * *